United States Patent [19]

Sundeen et al.

[11] Patent Number: 5,142,162
[45] Date of Patent: Aug. 25, 1992

[54] MOTOR VEHICLE BATTERY DISCHARGE CURRENT CONTROL

[75] Inventors: Arthur R. Sundeen, Lansing; Tina T. Bishop, Fenton, both of Mich.

[73] Assignee: General Motors Corporation, Detroit, Mich.

[21] Appl. No.: 624,744

[22] Filed: Dec. 11, 1990

[51] Int. Cl.$^5$ ............................................. H02H 7/18
[52] U.S. Cl. ............................ 307/10.7; 307/10.1; 307/595; 307/141.4
[58] Field of Search .............. 307/10.1, 10.6, 10.7, 307/10.8, 9.1, 141.4, 592, 595, 116, 246; 320/13, 38; 377/16; 340/636

[56] References Cited

U.S. PATENT DOCUMENTS

| | | | |
|---|---|---|---|
| 4,218,717 | 8/1980 | Shuster | 361/79 |
| 4,276,483 | 6/1981 | Hayden | 307/10.1 |
| 4,301,390 | 11/1981 | Earle | 315/82 |
| 4,493,001 | 1/1985 | Sheldrake | 361/92 |
| 4,733,100 | 3/1988 | Nusairat et al. | 307/9.1 |
| 4,864,154 | 9/1989 | Copeland et al. | 307/10.7 |

*Primary Examiner*—A. D. Pellinen
*Assistant Examiner*—David Osborn
*Attorney, Agent, or Firm*—Creighton R. Meland

[57] ABSTRACT

A battery discharge load current control system for a motor vehicle electrical system which can disconnect the battery from an electrical load to prevent over-discharge of the battery. The electrical load can be a so-called parasitic load which is of the type that is normally permanently connected to the battery. The electrical load is disconnected from the battery after the elapse of certain time periods. The system has a means for counting ignition cycles and after a certain count is attained, it is considered that the motor vehicle has been delivered to a purchasing customer. Prior to attaining the count, the time period is controlled to be about 1 or 2 days. After the count is attained, the time period is increased to be about 20 to 30 days.

6 Claims, 1 Drawing Sheet

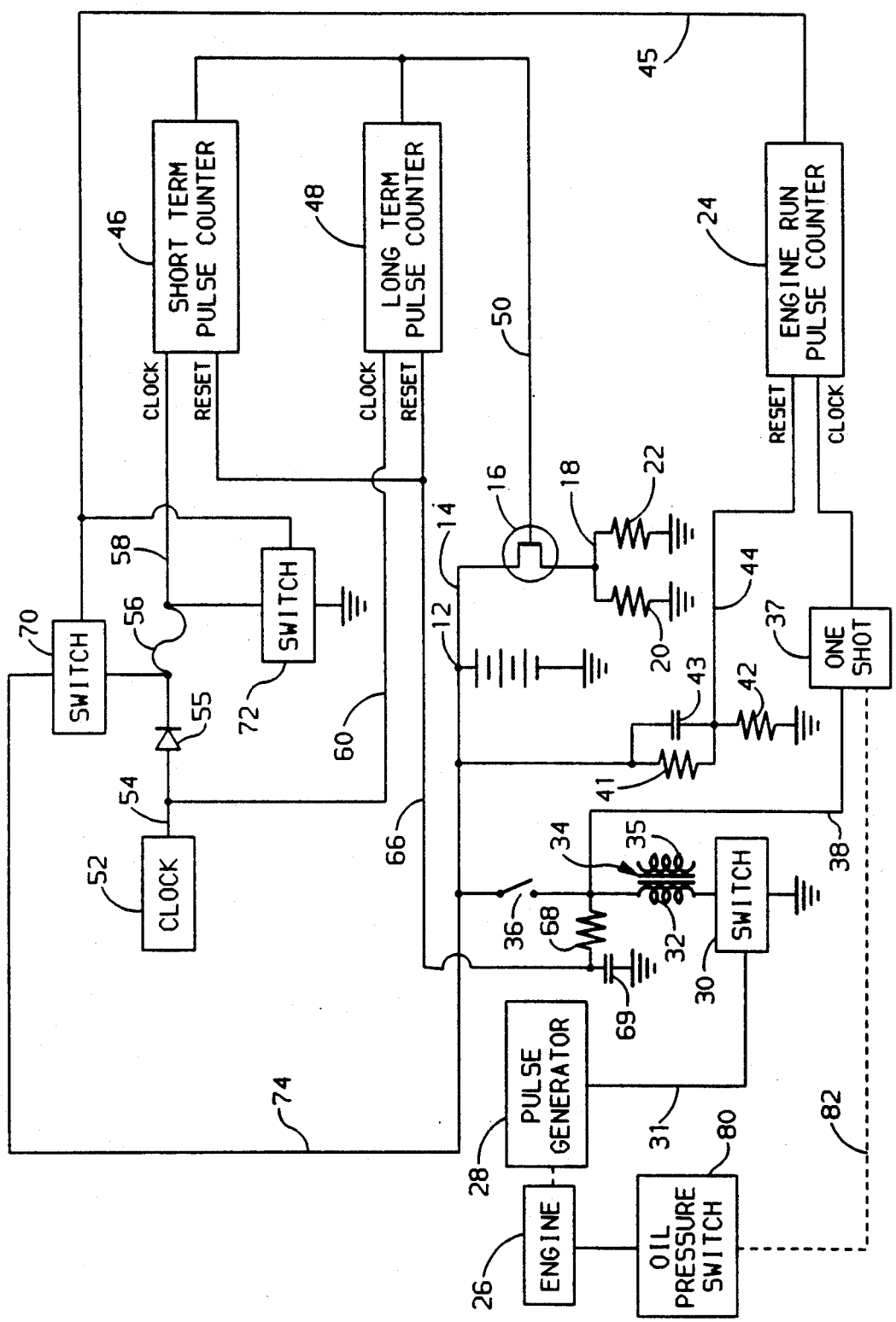

MOTOR VEHICLE BATTERY DISCHARGE CURRENT CONTROL

This invention relates to a battery discharge load current control for motor vehicle electrical systems which interrupts, on an elapsed time basis, the supply of battery current to certain motor vehicle loads to thereby prevent over-discharge of the battery.

In motor vehicle electrical systems there are certain electrical loads called parasitic loads that are permanently connected to the battery so that they are continuously energized. Examples of such parasitic loads are the clock portion of the radio, the keep-alive memory of the Electronic Control Module and the generator voltage regulator. These parasitic loads can draw about 10 to 30 milliamps. Although this is not a large load, the battery can be over-discharged by the parasitic loads if the engine is frequently started but not run long enough after the engine starts to recharge the battery. Further, if the vehicle is not operated at all for an extended period of time, for example, 20 to 30 days, the parasitic loads can over-discharge the battery.

After the assembly of a motor vehicle, but prior to delivery of the vehicle to a customer by a dealer, the vehicle engine may be started many times for short-run periods that do not sufficiently recharge the battery. In this regard, each start of the engine draws a large amount of current by the electric engine starter. This type of operation can occur in the vehicle assembly plant, during transit of the vehicle to a dealer or after the vehicle has been delivered to the dealer for sale to a customer.

The battery drain caused by the parasitic loads can be eliminated by disconnecting these loads from the battery. One way of accomplishing this is to remove the fuse that feeds the parasitic loads prior to shipment of the vehicle to the dealer. This does not totally solve the parasitic load problem, however, because many dealers, upon receipt of the vehicle, install the pulled fuse. In addition, pulling and reinstalling the fuse is costly and not without error.

This system of this invention disconnects the parasitic loads from the battery by an automatic control that disconnects the parasitic loads from the battery after the elapse of certain time periods following the opening of an ignition switch (ignition off). The time periods that are utilized depend on whether or not the vehicle has been delivered to a customer. Prior to customer delivery, the time period may be about 1 to 2 days. After customer delivery, the time period is increased to be about 20 to 30 days. Thus, after customer delivery, it is expected that the vehicle will be driven for relatively long time periods that will be sufficient to recharge the battery.

It, accordingly, is an object of this invention to provide an automatic control system for disconnecting parasitic loads from a battery that, prior to customer delivery, disconnects these loads from the battery after the elapse of a certain time period and wherein this time period is substantially increased after the vehicle is delivered to the customer. In carrying this object forward, the event of delivery to the customer is detected by counting the number of times that the engine of the vehicle has been started beginning with the first time the engine is started after being installed on a motor vehicle. One way of accomplishing this is to count ignition cycles; that is, counting each time the ignition system is energized to start the engine.

IN THE DRAWINGS

The single FIGURE drawing illustrates a battery discharge control system made in accordance with this invention.

Referring now to the drawing, the reference numeral 10 designates a 12-volt storage battery for a motor vehicle electrical system. The battery is charged by a diode-rectified alternating current generator (not illustrated) which is driven by the vehicle engine. The negative side of the battery is connected to ground and its positive side is connected to junction 12. Junction 12 is connected to conductor 14 which, in turn, is connected to one side of a P-channel power field effect transistor 16. The opposite side of transistor 16 is connected to a conductor 18. Connected between conductor 18 and ground are a plurality of parasitic electrical loads 20 and 22. These parasitic loads are of the type that in a conventional motor vehicle electrical system are permanently connected to the battery so that they are continuously energized. Examples of such parasitic loads are the clock portion of the radio and the keep-alive memory of the Electronic Control Module. These parasitic loads can draw about 10-30 milliamps. This is a relatively small battery discharge current draw, but if the vehicle is not driven for an extended period of time to recharge the battery, this current draw can over-discharge the battery.

The transistor 16 operates as a switch to either connect or disconnect the parasitic loads 20 and 22 to and from battery 10. When transistor 16 is biased conductive, the parasitic loads are energized and when transistor 16 is biased nonconductive, the parasitic loads are disconnected from the battery. As will be more fully described hereinafter, transistor 16 is biased nonconductive after the elapse of certain time periods.

The system of this invention includes means for providing an indication of when the motor vehicle is expected to have been delivered to a customer from the time it is manufactured and the engine is first started. To this end, the system has an engine run pulse counter 24 which is incremented by one count each time the engine is started. One way of accomplishing this is to connect the clock input of counter 24 to some part of the ignition system that develops a pulse each time an ignition cycle occurs as described in more detail hereinafter.

In the ignition system shown in the drawing, the engine 26 drives a pulse generator 28 which is connected to a semiconductor switching device 30 by line 31. The switching device may be a transistor. The switching device 30 is connected in series with the primary winding 32 of ignition coil 34. The secondary winding 35 of coil 34 is connected to the spark plugs of engine 26 (not illustrated), for example, by a conventional distributor (not illustrated).

The energization of the ignition system is controlled by an ignition switch 36. One side of this switch is connected to a one-shot multivibrator 37 by line 38. The opposite side of the one-shot 37 is connected to the clock input of counter 24. Each time the ignition switch 36 is closed, a pulse is applied to counter 24 which increments it by one count. The counter 24 accumulates a pulse count value that is equal to the number of times that the engine has been started or, putting it another way, counter 24 counts the number of times the ignition system is energized. This counting starts after the engine is installed on a vehicle and begins the first time the installed engine is started.

The counter 24 is set to a zero count level at the time the battery 12 is first installed and connected to the electrical system on the vehicle. Thus, when the battery is installed on the vehicle, a reset pulse is applied to counter 24 via a circuit comprised of resistors 41 and 42, capacitor 43 and line 44.

It can be appreciated that counter 24 counts ignition cycles and, accordingly, it accumulates a count that represents the number of times that the engine has been started. After the counter 24 has counted a predetermined number of ignition cycles, the counter causes a change in logic state of output line 45. This predetermined number of ignition cycles is intended to occur at the time of delivery of the vehicle to the customer. The manner in which the signal on line 45 controls the system is described in detail hereinafter.

Counter 24 can be comprised of one or more Type 4020 14 stage binary counters.

The switching state of transistor 16 (on or off) is controlled by a short term pulse counter or timer 46 and a long term pulse counter or timer 48. The outputs of these timers are both connected to the gate of transistor 16 via line 50.

Counters 46 and 48 can be comprised of one or a plurality of cascaded Type 4020 counters. The clock inputs of counters 46 and 48 are connected to a source of clock pulses 52 which may have a pulse rate of about 5 Hz. The clock pulses are applied to counter 46 via line 54, a diode 55, fuse 56 and line 58. The clock pulses are applied to counter 48 via lines 54 and 60.

The short term counter 46 times-out and develops a signal that is applied to line 50 after counter 46 has counted a predetermined number of clock pulses that corresponds to a time period of about 1 or 2 days. The long term counter or timer 48 develops an output signal after it has counted a predetermined number of clock pulses that correspond to a time period of about 20 to 30 days.

Counters 46 and 48 are reset to a zero count level each time ignition switch 36 is closed. Thus, the reset inputs of these counters is connected to one side of the ignition switch by conductor 66 and resistor 68. A capacitor 69 is connected between conductor 66 and ground.

The output line 45 of pulse counter 24 is connected to control the on-off status of switches 70 and 72. Switch 70 is connected between conductor 74 and one side of fuse 56. Switch 72 is connected between the opposite side of fuse 56 and ground. Switches 70 and 72 may be transistors or controlled rectifiers or could take other forms. If both switches 70 and 72 are biased on or conductive, the battery supplies current to fuse 56 of a value that is high enough to blow or open fuse 56. When this happens, the clock input of counter 46 is permanently disconnected from clock pulse source 52.

The blowing of fuse 56 occurs once counter 24 has accumulated a predetermined number of ignition cycles corresponding to when it is expected that the vehicle has been delivered to a customer. At the time-out of counter 24, a signal is developed on line 45 which biases switches 70 and 72 conductive.

The operation of the system of this invention will now be described. Let it be assumed that counter 24 has not accumulated the predetermined number of ignition cycles. Because of this, it is expected that the vehicle has not, as yet, been delivered to a customer. Under this condition of operation, at the opening of ignition switch 36, short term counter 46 starts counting clock pulses from clock 52 When the counter 46 has counted a number of pulses corresponding to a time period of about 1 or 2 days, the counter 46 changes the logic state of line 50 so that transistor 16 is now biased nonconductive. The parasitic loads 20 and 22 are now disconnected from the battery 12. Transistor 16 remains biased nonconductive as long as ignition switch 36 is open. When ignition switch 36 is subsequently reclosed, counters 46 and 48 are reset to zero count levels and transistor 16 is biased on.

Assume now that counter 24 has counted a predetermined number of ignition cycles corresponding to a time that it is expected that the vehicle has been delivered to a customer. This, as previously explained, causes the fuse 56 to blow. This, in effect, has removed short term counter 46 from controlling the system since it now receives no clock pulses. Counter 48, however, does receive clock pulses and after it has counted a number of pulses corresponding to a time period of about 20 to 30 days, transistor 16 is biased nonconductive to disconnect the parasitic loads 20 and 22 from battery 12.

In summary, it can be seen that the system of this invention, prior to customer delivery, shuts off the parasitic loads after the elapse of a time period of about 1 or 2 days following the opening of ignition switch 36. This time period is extended to about 20 to 30 days after the vehicle has been delivered to a customer.

It will be appreciated that counters 46 and 48 can be comprised of a single counter with suitable triggerable logic circuitry to form the short term and long term output timing functions.

Further, although the system has been disclosed as a hard-wired digital system, it can be implemented by a programmed microprocessor.

The event of customer delivery of the vehicle has been disclosed as being determined by counting ignition cycles or the number of times that the ignition system has been energized to start the engine.

The number of times that the engine has been started can be detected in other manners. For example, an engine oil pressure switch 80 can be utilized which responds to engine oil pressure and which closes each time the engine is started. In this alternative arrangement, the one-shot 37 is triggered when the engine is started to cause the oil pressure switch 80 to close. The connection between switch 80 and one-shot 37 is illustrated by the dotted line 82.

The embodiments of the invention in which an exclusive property or privilege is claimed are defined as follows:

1. A battery discharge load current control system for a motor vehicle electrical system comprising, a battery, an electrical load, a switching means connected to said battery and electrical load for disconnecting and connecting said load to and from said battery, an ignition switch, timer means, means coupling said ignition switch to said timer means such that said timer means begins a timing cycle when said ignition switch is opened, means connecting said timer means to said switching means in such a manner as to cause said switching means to disconnect said battery and said electrical load after the elapse of either a selectable first or second time period beginning with the opening of said ignition switch, customer vehicle delivery detecting means responsive to starting of the vehicle engine for developing a signal when the total number of engine starts attains a predetermined value, and means operative to select said first time period prior to development of said signal and operative to select said second time period after said signal has been developed, said second time period being longer than said first time period.

2. The system according to claim 1 where said customer vehicle delivery detecting means comprises a counter for counting ignition system cycles.

3. The system according to claim 1 where said timer means comprises a pulse counting means connected to a source of constant frequency clock pulses.

4. The system according to claim 1 where said time periods exceeds one day.

5. The system according to claim 1 where said first time period is of the order of about 1 or 2 days and second time period is of the order of 20 to 30 days.

6. The system according to claim 1 where said electrical load is a parasitic type of load.

* * * * *